United States Patent [19]

Lirette

[11] Patent Number: 5,779,229
[45] Date of Patent: Jul. 14, 1998

[54] CABLE TRAY ASSEMBLY INCLUDING A PULLING MECHANISM

[76] Inventor: Gilles Lirette, 2528, Avenue de la Falaise, Sillery, Québec, Canada, G1T 1W3

[21] Appl. No.: 761,490

[22] Filed: Dec. 6, 1996

[51] Int. Cl.$^6$ ....................................... H02G 1/08
[52] U.S. Cl. ...................... 254/134.3 FT; 254/134.3 R
[58] Field of Search ................... 254/134.3 FT, 254/134.3 R

[56] References Cited

U.S. PATENT DOCUMENTS

| | | |
|---|---|---|
| 3,110,480 | 11/1963 | Eitel . |
| 3,172,642 | 3/1965 | Eitel . |
| 3,191,910 | 6/1965 | Eitel . |
| 3,218,033 | 11/1965 | Miller . |
| 3,224,733 | 12/1965 | Ensley . |
| 3,291,449 | 12/1966 | Hugues . |
| 3,343,809 | 9/1967 | Newell . |
| 3,543,377 | 12/1970 | Bremner . |
| 3,602,467 | 8/1971 | Thomas . |
| 3,908,962 | 9/1975 | Ross . |
| 3,970,286 | 7/1976 | Ross . |
| 4,205,827 | 6/1980 | MacFarlane . |
| 4,337,922 | 7/1982 | Streiff et al. . |
| 4,456,225 | 6/1984 | Lucas . |
| 4,465,261 | 8/1984 | Giroux . |
| 4,502,666 | 3/1985 | Mattelon et al. . |
| 4,690,381 | 9/1987 | Asai . |
| 5,217,207 | 6/1993 | Schmader et al. . |

FOREIGN PATENT DOCUMENTS 406030512   2/1994   Japan .

Primary Examiner—James G. Smith
Assistant Examiner—Lee Wilson
Attorney, Agent, or Firm—Goudreau Gage Dubuc & Martineau Walker

[57] ABSTRACT

A cable tray assembly including a pulling mechanism is described herein. The cable tray assembly includes a tray member defining a predetermined path and mounted in the ceiling of a building to support a plurality of cables extending from a dedicated room to a plurality of workstations. The pulling mechanism includes a pulling rope defining a closed circuit and mounted to the tray member through pulleys for longitudinal movements along the predetermined path. The pulling rope is provided with a cable securing element to which cables to be installed from the dedicated room to the workstations may be attached. Longitudinal movements of the pulling rope along the predetermined path will therefore displace the cable securing element and the cables attached to it from the dedicated room towards the workstation.

16 Claims, 5 Drawing Sheets

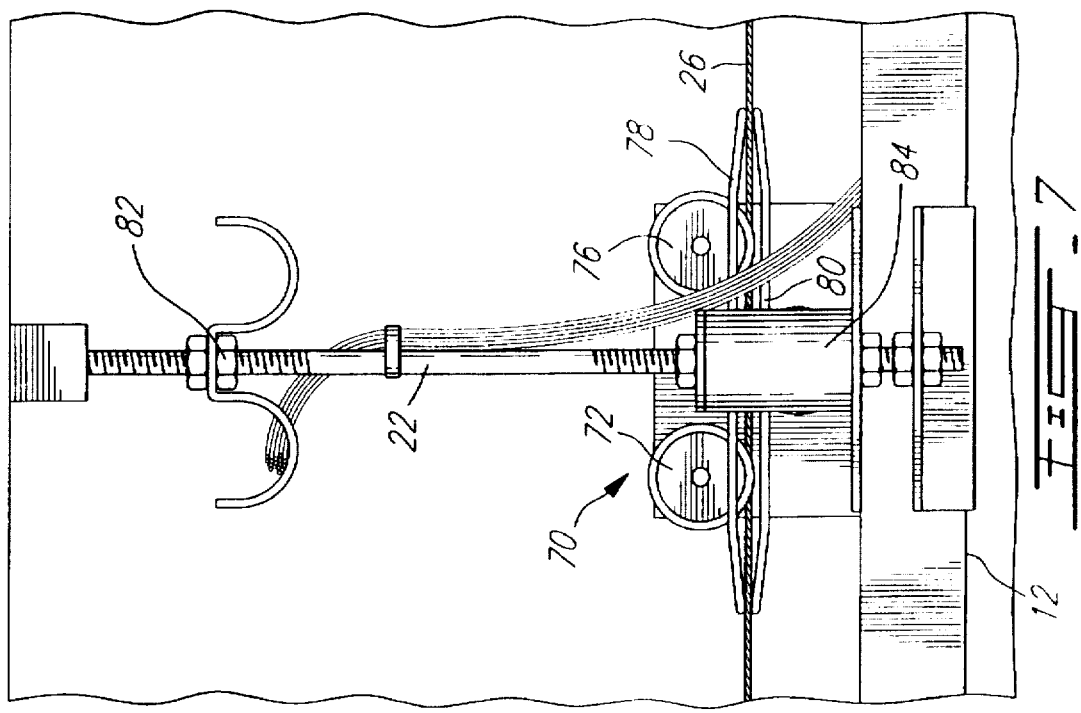
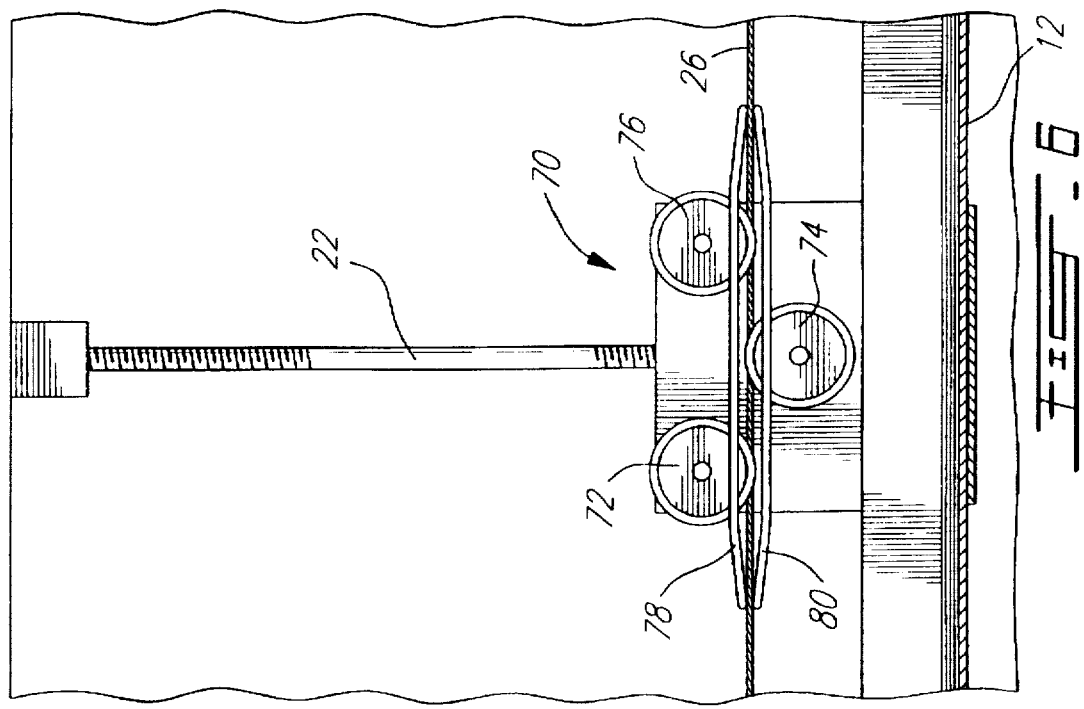

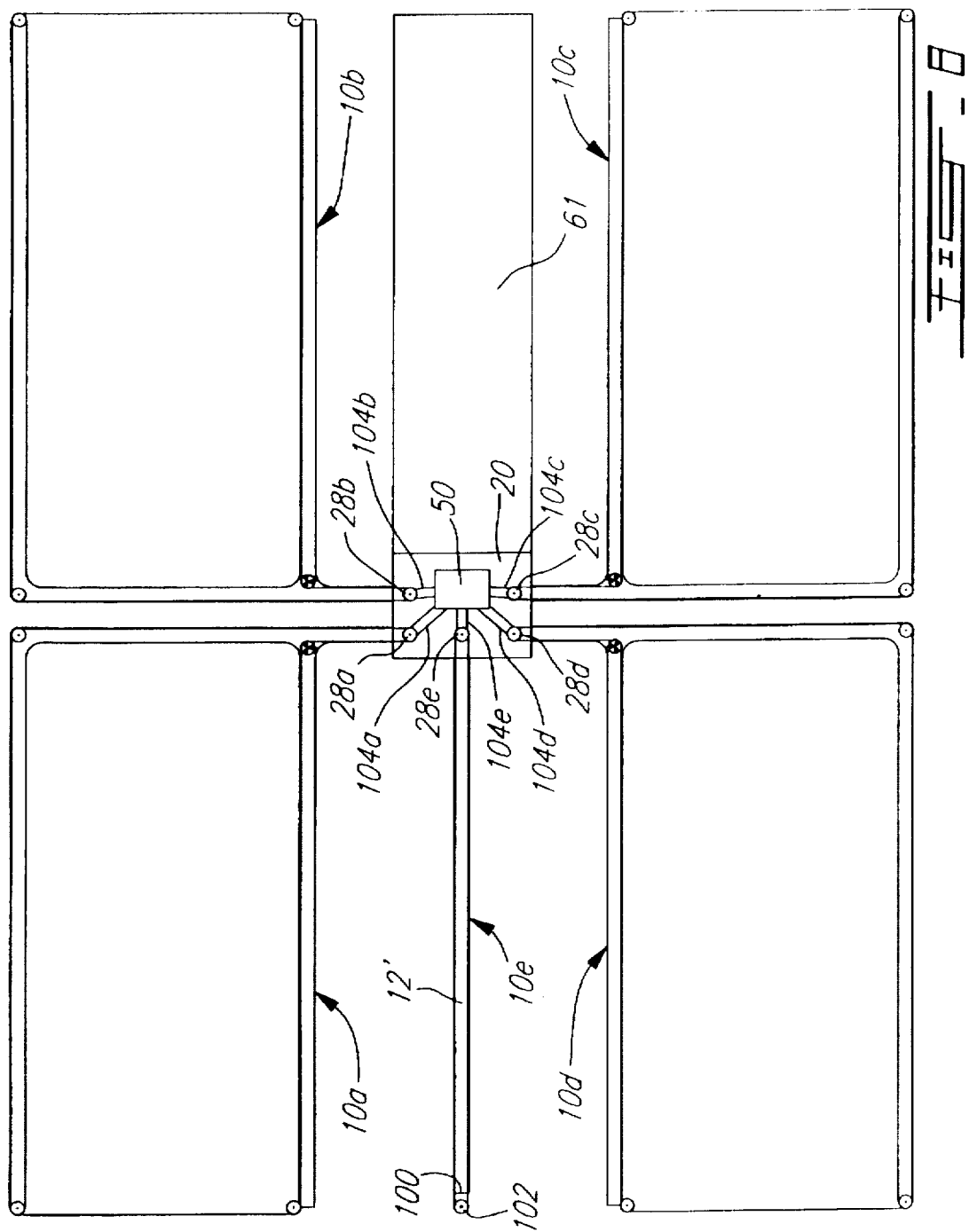

CABLE TRAY ASSEMBLY INCLUDING A PULLING MECHANISM

FIELD OF THE INVENTION

The present invention relates to cable tray assemblies for supporting cables. More specifically, the present invention relates to a cable tray assembly including a pulling mechanism for pulling and guiding cables from a first location to a second location, for example from a computer room to a workstation.

BACKGROUND OF THE INVENTION

With the increasing number of small and medium businesses having a local area network (LAN), the number of cables to be installed from a dedicated room, hereinafter referred to as a computer room, to a plurality of workstations has increased. These cables may be, for example, data cables, telephone cables, low voltage power cables, or the like.

Conventionally, the installation of cables from the computer room to a plurality of workstations involves the use of a fish wire to pull the cable from the computer room to a particular workstation, through the ceiling. This method of installation has many drawbacks, for example the pulling operation must often be done in multiple steps if the distance between the computer room and the workstation is great, which increases the cables installation costs.

OBJECTS OF THE INVENTION

An object of the present invention is therefore to provide a cable tray assembly free of the drawbacks of the prior art.

SUMMARY OF THE INVENTION

More specifically, in accordance with the present invention, there is provided a cable tray assembly for supporting at least one cable, comprising:

- a tray member for supporting the cable; the tray member defining a predetermined path; and
- a cable pulling mechanism including:
  - a pulling rope defining a closed circuit and including a securing element for securing the cable to the pulling rope; and
  - pulling rope mounting means for mounting the pulling rope longitudinally movable with at least a portion of the pulling rope extending along the predetermined path;

wherein, in operation, the cable is secured to the pulling rope through the securing element and is pulled along the predetermined path by longitudinally moving the rope in order to displace the securing element along the predetermined path from a first location to a second location while the cable is supported by the tray member.

By using a pulling rope defining a closed circuit and mounted longitudinally movable along at least a portion of the predetermined path, a cable to be installed, when secured to the pulling rope, may be displaced along the predetermined path while being supported by the tray element.

It is to be noted that in the present disclosure, as well as in the appended claims, (a) the term "cable" is to be construed as encompassing data cables, low voltage power cables, telephone cables, optical fiber cables or any other type of wire that may be installed from one location to another, and (b) the term "workstation" encompasses actual computer workstations as well as offices, cubicles or the like where cables need to be installed.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 6 is a sectional view taken along line 6—6 of FIG. 1;

FIG. 7 is a sectional view taken along line 7—7 of FIG. 1; and

FIG. 8 is a schematic top plan view of a story of a building including a plurality of cable tray assemblies according to a preferred embodiment of the present invention.

DESCRIPTION OF THE PREFERRED EMBODIMENT

Figure 1:
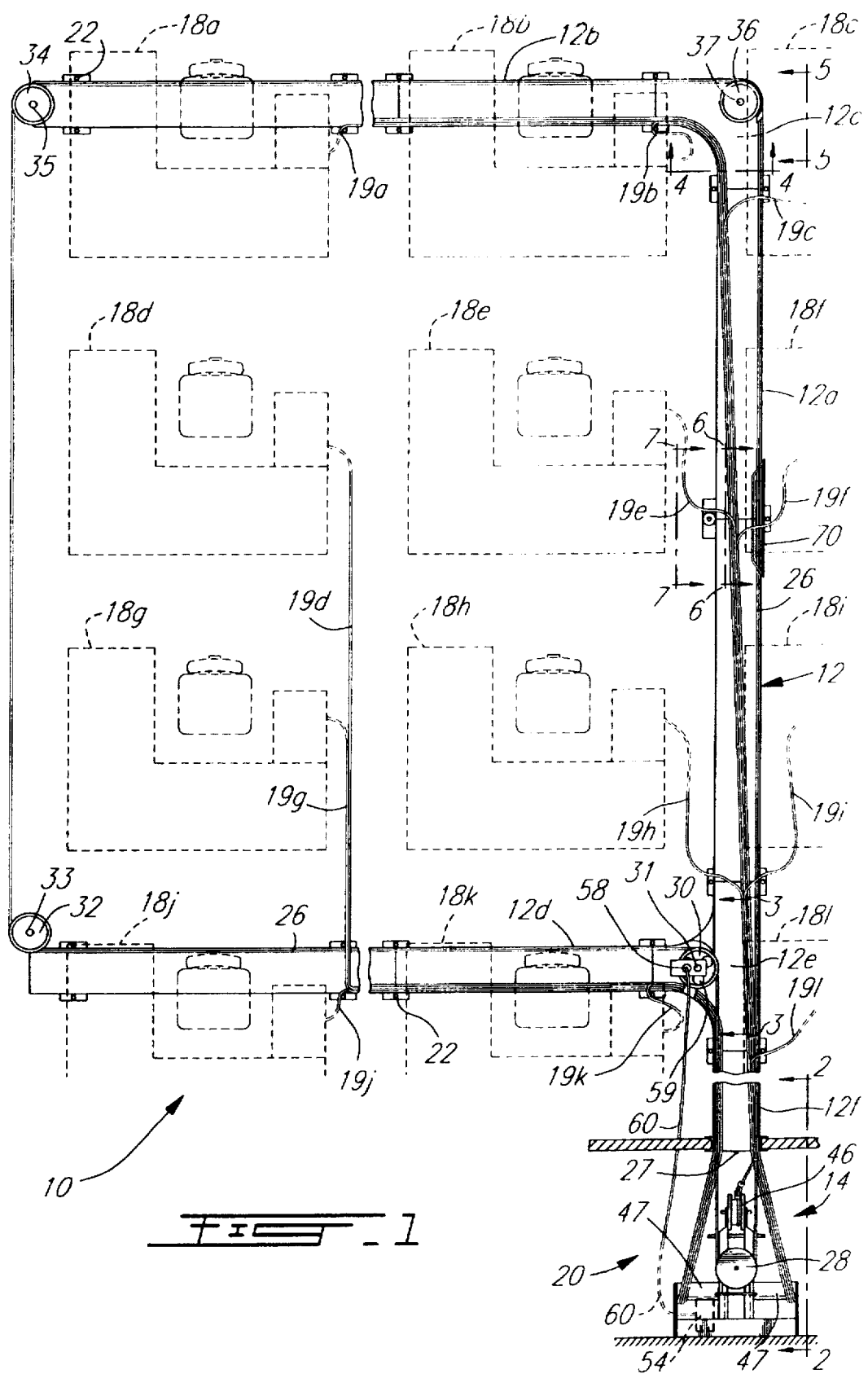
FIG. 1 is a top plan view of a cable tray assembly according to a preferred embodiment of the present invention.

FIG. 1 of the appended drawings is a top plan view illustrating a cable tray assembly 10 according to a preferred embodiment of the present invention. The cable tray assembly 10 includes a supporting tray 12 and a pulling mechanism 14.

The supporting tray 12 is installed in the ceiling 16 (see FIG. 2) of a building and defines a predetermined path advantageously chosen so that the supporting tray 12 extends in the proximity of a maximum number of workstations, for example 18a–18l, where cables, for example 19a–19l, are required.

The supporting tray 12 includes a first straight portion 12a, a second straight portion 12b connected to the first straight portion 12a through an elbow portion 12c, a third straight portion 12d connected to the first straight portion 12a through a T-shaped portion 12e and a fourth straight portion 12f connected to the T-shaped portion 12e. The supporting tray 12 therefore generally defines an inverted F-shaped predetermined path.

The fourth straight portion 12f of the supporting tray 12 is open to a computer room 20 thereby allowing cables to be installed from the computer room 20 to the workstations 18a–18l while being supported by the tray 12. Indeed, as can be seen from FIG. 2, an opening 21 is provided in a wall 23 of the computer room 20 to allow the straight portion 12f to enter the computer room 20. The straight portion 12f optionally includes a downwardly curved section 25 onto which the cables may slide, and an opening separator 27 separating the cables going towards portion 12b and the cables going towards portion 12d as will be described hereinafter.

Figure 4:
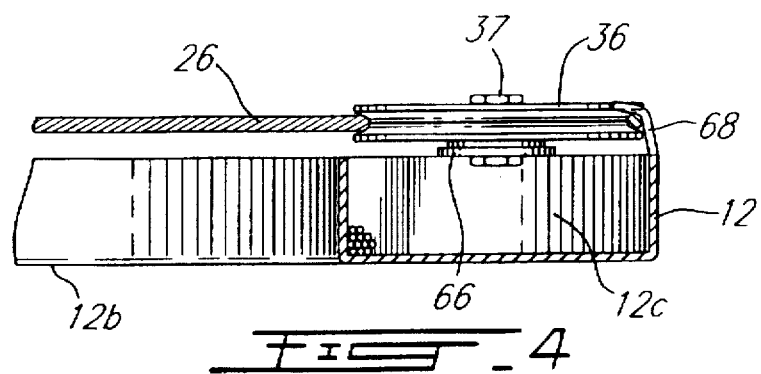
FIG. 4 is a sectional view taken along line 4—4 of FIG. 1.

As can be better seen from FIG. 4, the supporting tray 12 has a generally U-shaped cross-section, supporting the cables extending from the computer room 20 to the workstations 18a–18l.

Figure 2:
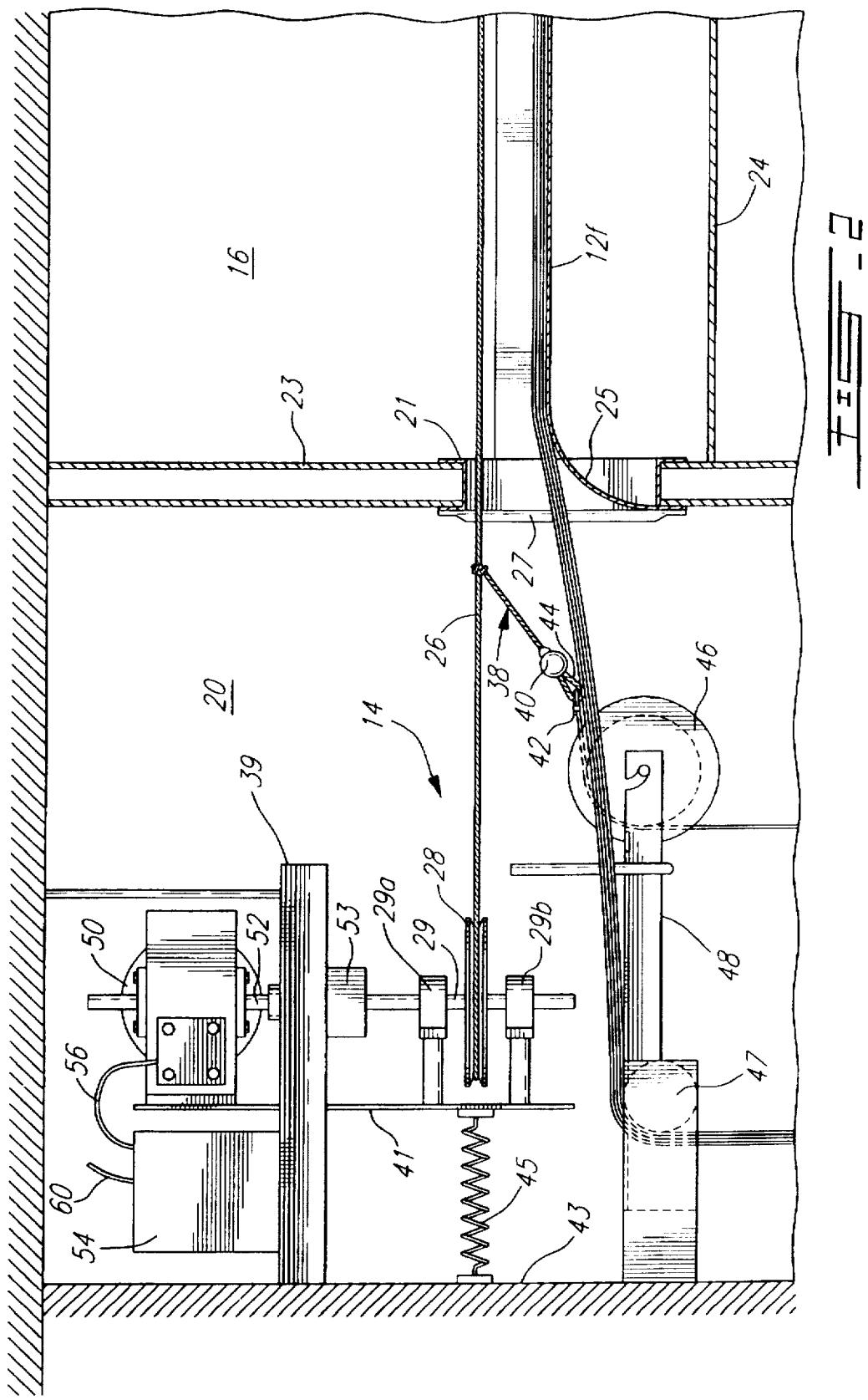
FIG. 2 is a sectional view taken along line 2—2 of FIG. 1.

The supporting tray 12 is positioned in the ceiling 16 by a plurality of supports 22, suspending the supporting tray 12 above an overhead surface 24 (see FIG. 2).

The pulling mechanism 14 includes a tensioned pulling rope 26 defining a closed circuit having a portion in the computer room 20 and a portion extending along the predetermined path. The pulling rope 26 is mounted to a plurality of pulleys 28, 30, 32, 34 and 36 for longitudinal movements along the predetermined path defined by the supporting tray 12. The pulleys 28, 30, 32, 34 and 36 are respectively mounted to vertical shafts 29, 31, 33, 35 and 37 enabling rotation of these pulleys, about their respective shafts, in a horizontal plane. Rotation of the pulleys therefore cause longitudinal movements of the pulling rope 26 along the supporting tray 12.

As illustrated in FIG. 1, the pulling rope 26 defines a generally inverted P-shaped closed circuit.

The shaft 29 of the pulley 28 is rotatably mounted to a shaft support 41 through bearings 29a and 29b. The shaft support 41 is slidably mounted to a fixed support 39, mounted to a wall 43 of the computer room 20. The shaft support 41 may therefore horizontally slide in the support 39.

As will be readily apparent to one skilled in the art, the tensioned puling rope 26 pulls the shaft support 41 towards the wall 23 of the computer room 20. To compensate for this pulling action of the pulling rope 26, a spring assembly 45 is mounted between the shaft support 41 and the wall 43. By adequately choosing the strength of the spring assembly 45, the tension on the pulling rope 26 will be kept sufficient to prevent slippage of the rope 26 on the pulleys.

The pulling mechanism 14 includes a cable securing element 38 attached to the pulling rope 26. The cable securing element 38 includes an abutting sphere 40 the purpose of which will be described hereinafter. As can be seen from FIG. 2, cables 42, to be installed between the computer room 20 and a workstation, may be secured to a loop 44 of the cable securing element 38.

The pulling mechanism 14 also includes a rotatable support 46 and a fixed cylindrical support 47, both mounted to a support assembly 48. The cables 42, to be installed from the computer room 20 to a workstation, rest on the support 46 to facilitate the pulling action of the rope 26 by decreasing the friction. When the cables are fully installed between the computer room 20 and the workstation, they are disengaged from the rotatable support 46 and are supported by the fixed support 47.

Optionally, the pulling mechanism 14 may include an electric motor 50 mounted to the support 39 through the shaft support 41, and provided with a driving shaft 52 mechanically connected to the shaft 29 of the pulley 28, through a clutch 53, to selectively rotate the pulley 28, to therefore longitudinally move the pulling rope 26 along the predetermined path. A control circuit 54 is connected to the motor 50 through a control cable 56 to control the operation of the electric motor 50. As can be seen from FIG. 3, a magnetic rotation sensor 58 is mounted to the tray 12 to detect rotation of the pulley 30. The rotation sensor 58 is connected to the control circuit 54 through a data cable 60 to supply rotational data to the control circuit 54.

As can be seen from FIG. 1, the magnetic sensor 58 uses three disks 59, mounted to the pulley 30, to detect the rotation of this pulley and therefore the longitudinal movements of the pulling rope 26. The sensor 58 therefore sends three signals to the control circuit 54 for each rotation of the pulley 30. The control circuit 54 is therefore provided with a delay circuit (not shown) to determine the longitudinal movement of the pulling rope 26. The pulling rope 26 must therefore be stopped for a predetermined short period of time before the control circuit 54 senses that the rope 26 does not move. This feature is advantageous for the operation of the motor 50 through movements of the pulling rope 26 as will be described hereinafter.

It is to be noted that the sensor 58 could be installed to another pulley, and that many type of sensors could be used to detect the rotation of the pulleys, for example, magnetic sensors or mechanical sensors mechanically connected to the shaft of one of the pulleys.

Figure 3:
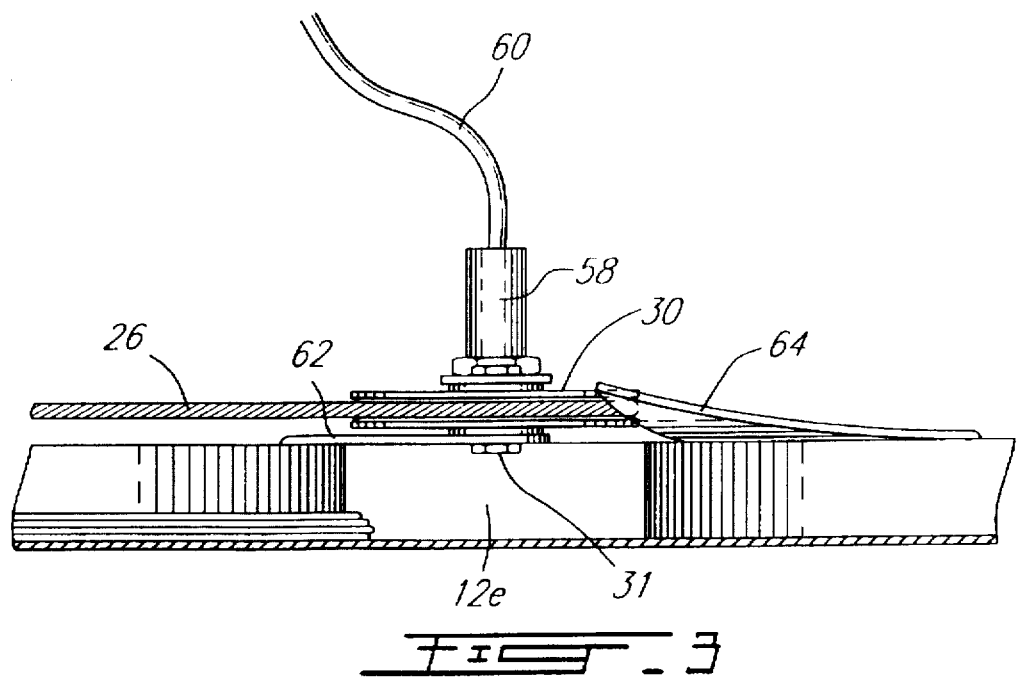
FIG. 3 is a sectional view taken along line 3—3 of FIG. 1.
Figure 5:
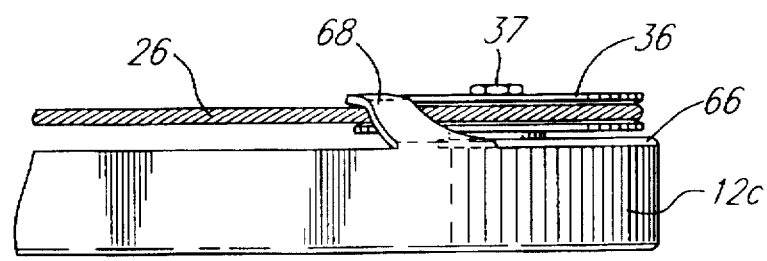
FIG. 5 is a sectional view taken along line 5—5 of FIG. 1.

Turning now to FIGS. 3 to 5, the pulleys 30 and 36 will be described in greater details.

The pulley 30 is mounted to the tray 12, above the T-shaped portion 12e, through a support 62. The pulley 30 allows the pulling rope 26 to extend longitudinally along the fourth straight portion 12f and to extend longitudinally along the third straight portion 12d, even if these two portions are generally perpendicular.

The T-shaped portion 12e includes an upwardly sloping baffle guard 64. The purpose of the baffle guard 64 is to downwardly deflect the abutting sphere 40 of the cable securing element 38 to prevent the cables attached to cable securing element 38 from entering the pulley 30 which would result in cable damage and would prevent subsequent uses of the pulling rope 26. Indeed, the shape and the position of the baffle guard 64 cause the cable securing element 38, along with the cables attached to it, to be deflected under the pulley 30.

Turning now to FIG. 4, the pulley 36 is mounted to the tray 12, above the elbow portion 12c, through a support 66. The pulley 36 allow the pulling rope 26 to extend longitudinally along the first straight portion 12a and to extend longitudinally along the second straight portion 12b, even if these two portions are generally perpendicular.

The elbow portion 12c includes a generally upwardly sloping baffle guard 68. The purpose of the baffle guard 68 is to downwardly deflect the abutting sphere 40 of the cable securing element 38 to prevent the cables attached to the cable securing element 38 from entering the pulley 36 which would result in cable damage and would prevent subsequent uses of the pulling rope 26. Indeed, the shape and the position of the baffle guard 68 cause the cable securing element 38, along with the cables attached to it, to be deflected under the pulley 36.

Of course, as will be apparent to one skilled in the art, the baffles guards 64 and 68 could be shaped differently or could be mounted in other locations, as long as they performed their function, which is to prevent the cables attached to the cable securing element 38 from entering the pulleys.

Turning now to FIGS. 6 and 7, the pulling mechanism 14 also includes a rope supporting bracket 70, mounted to the tray 12 and supporting the pulling rope 26 at a predetermined distance above the tray 12.

The rope supporting bracket 70 includes three staggered pulleys 72, 74 and 76 to which the pulling rope 26 is mounted. The staggered relationship of the pulleys 72, 74 and 76 prevent the removal of the pulling rope 26 from the supporting bracket without removing the tension on the pulling rope 26. The pulling rope 26 is therefore maintained at a distance from the tray 12 that is determined by the position of the staggered pulleys.

The supporting bracket 70 also includes a pair of longitudinal guides 78 and 80 between which the pulling rope 26 is installed. The purpose of the guides 78 and 80 is to prevent the cables being pulled from entering the staggered pulleys. Indeed, the distance between the guides 78 and 80 is not sufficient to allow the abutting sphere 40 of the cable securing element 38 therebetween. The abutting sphere 40 will therefore abut the guides 78 and 80, and the cables attached to the loop 44 will remain in the tray 12.

It is to be noted that while only one bracket 70 is illustrated in FIG. 1, more than one could be installed to the tray 12. It has been found that brackets 70 positioned about 20 feet (6 meters) apart would be sufficient to adequately maintain the rope 26 above the tray 12.

FIG. 7 also illustrates a cable support 82 and a friction reducing tube 84. The cable support 82 is used to support cables already extending between the computer room 20 and the workstations. On the other hand, when the cables are installed between the tray 12 and the workstation, they are applied to the side of friction reducing tube 84 to reduce the friction caused by the manual pulling of the cables from the tray 12 to the workstation.

It is to be noted that the predetermined path defined by the supporting tray 12 could be different that the generally inverted F-shaped predetermined path illustrated in FIG. 1. As non-limitative examples, the predetermined path could define generally non-inverted F-shape, it could define a generally inverted, or non-inverted, P-shape simply by adding a tray portion between pulleys 32 and 34, or, by simply adding a second pulley to the elbow portion 12c, it could define a L-shape.

As will be apparent to one skilled in the art, the predetermined path illustrated in FIG. 1 advantageously allows the pulling rope 26 to define a closed circuit without requiring too many pulleys. Indeed, if the number of pulleys is multiplied, the friction between the cables being pulled and the vertical walls of the U-shaped supporting tray 12 is increased, which may lead to the damage of the cables being pulled. The number of pulleys used, while not being critical, must therefore be maintained as low as possible to prevent damages to the cables being installed.

In operation, when a cable has to be installed between the computer room 20 and a workstation, the first step is to determine which tray portion 12a, 12b, 12d or 12f of the supporting tray 12 is the nearest of the workstation. This will decide in which direction the pulley 28 will be rotated.

If one of the portions 12a and 12b is the nearest portion to the workstation, the pulley 28 will be rotated counterclockwise (as seen from FIG. 1), so that the cable securing element 38 is pulled toward the portion 12b. If the portion 12d is the nearest section to the workstation, the pulley 28 will be rotated clockwise (as seen from FIG. 1), so that the cable securing element 38 is pulled toward the portion 12d. Finally, if the portion 12f is the nearest section to the workstation, the pulley 28 will be rotated either clockwise or counterclockwise since, in any case, the cable securing element 38 passes through portion 12f.

It is to be noted that, in the following description of the operation of the cable tray assembly 10, the rotation of the pulley 28 to cause a movement of the pulling cable 26 may be done manually by a manual pulling action on the pulling cable 26 or may be done by energizing the electric motor 50 if this motor is present.

The pulley 28 is rotated in the above determined direction until the cable securing element 38 is positioned between the pulley 28 and the opening 21, as illustrated in FIG. 2.

The cables to be installed between the computer room 20 and a workstation may then be secured to the loop 44 of the securing element 38 and they may be engaged in the rotatable support 46.

The pulley 28 is then rotated until the securing element 38 is positioned outside the computer room 20 and until the cables attached to the cable securing element 38 are supported by the portion 12f of the tray.

The user now has two options. The first option consists in going to the location where the cables being installed will leave the tray 12, and then turn the pulley 28 (by manually pulling on the rope 26 or by energizing the motor 50) until the cable securing element 38 reaches the user.

If the motor 50 is used, a second user must stay in the computer room 20 and operate the motor 50 or, optionally, the control circuit 54 may be operated by a remote control (not shown).

It is to be noted that, since the sensor 58 supplies information about the longitudinal movements of the pulling rope 26 to the control circuit 54, the motor 50 may automatically be started or stopped, by the control circuit 54, if the sensor 58 senses that the pulling rope 26 is manually moved or manually stopped, respectively. Indeed, the clutch 53 mounted between the motor 50 and the shaft 29 enables the pulling rope 26 to be manually moved even if the motor 50 is not energized and enables the rope 26 to be menually stopped even if the motor 50 is energized. Therefore, if a motor 50 is used, the user may go at the location where the cables will leave the tray 12, energize the motor 50 by pulling on the rope 26 in the appropriate direction, and stop the motor 50 when the cable securing element 38 arrives by manually applying a force against the movement of the pulling rope 26 for a predetermined period of time as discussed hereinabove with respect to the delay circuit (not shown) of the control circuit 54.

The second option requires the use of a stopping element, under the form of locking pliers (not shown), for example, that may be manually secured to the supporting tray 12 where the cables being installed will leave the tray 12. The stopping element includes an aperture sized to slidably receive the pulling rope 26, but too small to let the abutting sphere 40 of the cable securing element 38 go through. Therefore, when the cable securing element 38 reaches the stopping element, the motor 50 will be stopped by the control circuit 54 in view of the information supplied by the sensor 58, as described hereinabove. The user may therefore install the stopping element (not shown) to the tray 12 at the location where the cables being installed will leave the tray 12, and then go back to the computer room 20 to energize the motor 50, that will automatically stop when the cable securing element 38 reaches the stopping element.

The user then removes, from the loop 44, the cables being installed, apply them to the friction reducing tube 84 (see FIG. 7) and manually pull an adequate length of the cables being installed to reach the desired workstation. The cables being installed may then be supported by the cable support 82.

It is also possible to install connectors (now shown) to the tray 12 to electrically connect the cables supported by the tray 12 and then use separate cables (not shown) to cover the distance between the tray 12 and the workstation. This feature eliminates the need to manually pull the cables from the tray 12 to the workstation.

As illustrated in FIG. 1, the cables 19a–19c, 19e, 19f, 19h and 19i, extending between the computer room 20 and the workstations 18a–18c, 18e, 18f, 18h and 18i, respectively, are supported by the tray portions 12a and/or 12b, cables 19d, 19g, 19j and 19k extending between the computer room 20 and the workstations 18d, 18g, 18j and 18k, respectively, are supported by tray portion 12d, and cable 191 extending between computer room 20 and workstation 181 is supported by tray portion 12f.

It is to be noted that since workstation 18d is approximately positioned at equal distances from tray portion 12b and from tray portion 12d, the cable 19d, extending between the computer room 20 and this workstation, could also be supported by portion 12b. However, if this was the case, the length of the cable 19d would be increased, therefore increasing the installation cost.

As will be easily understood by one of ordinary skill in the art, when more than one cable tray assembly 10 is required to provide adequate coverage of a floor of a building, the corresponding pulleys 28 of the additional pulling mechanisms may be connected to the shaft 29, shown in FIG. 2, to thereby use a single motor 50 to mechanically rotate the pulleys 28, reducing the overall installation costs.

FIG. 8 of the appended drawings schematically illustrates a story of a building provided with five cable tray assemblies 10a–10e to cover the entire area of the story.

The computer room 20 is advantageously centrally positioned on the floor to allow the cable tray assemblies 10a–10e to go in different directions. It is to be noted that there is no cable tray assemblies towards a room 61 which is reserved for elevators, electrical chambers, or the like, that do not contain cables extending to the computer room 20.

The cable tray assemblies 10a–10d are similar to the cable tray assembly 10 shown in FIGS. 1–7, while cable tray assembly 10e is formed of a single straight tray portion 12' provided with a pulley 100 at its distal end 102.

As will be apparent to one skilled in the art, a single motor 50 may be used to actuate the pulleys 28a–28e of the tray assemblies 12a–12e simultaneously or one at a time through, for example belts 104a–104e mounted between the motor 50 and the pulleys 28a–28e, respectively. Another method for driving the pulleys 28a–28e through a single motor 50 would be to vertically stack these pulleys on a common shaft driven by the motor 50. It is however believed that this solution would be more mechanically challenging.

It is also to be noted that if cables are required on different stories of a building, separate cable tray assemblies according to the present invention may be installed on each story and that cables may be vertically installed from the computer rooms 20 of the different stories through vertical conduits (not shown).

Although the present invention has been described hereinabove by way of preferred embodiments thereof, it can be modified, without departing from the spirit and nature of the subject invention as defined in the appended claims.

What is claimed is:

1. A cable tray assembly for supporting at least one cable, comprising:

a tray member for supporting said at least one cable; said tray member defining a predetermined path; and a cable pulling mechanism including:

a pulling rope defining a closed circuit and including a securing element for securing said at least one cable to said pulling rope; and pulling rope mounting means for mounting said pulling rope longitudinally movable with at least a portion of said pulling rope extending along said predetermined path;

wherein, in operation, said at least one cable is secured to said pulling rope through said securing element and is pulled along said predetermined path by longitudinally moving said rope in order to displace said securing element along said predetermined path from a first location to a second location while said at least one cable is supported by said tray member.

2. A cable tray assembly as defined in claim 1, wherein said tray member includes a plurality of tray portions assembled end to end.

3. A cable tray assembly as defined in claim 2, wherein said tray member includes at least one straight tray portion.

4. A cable tray assembly as defined in claim 2, wherein said tray member includes at least one curved tray portion.

5. A cable tray assembly as defined in claim 1, wherein said pulling rope mounting means include at least one pulley for deviating said pulling rope along the predetermined path.

6. A cable tray assembly as defined in claim 5, wherein (a) said securing element includes an abutting portion, and (b) said at least one pulley includes a deflecting means so mounted to said tray member as to prevent said abutting portion from entering said pulley; said at least one cable secured to said securing element will be prevented from entering said pulley.

7. A cable tray assembly as defined in claim 6, wherein (a) said at least one pulley are mounted over said tray element, and (b) said deflecting means include a sloping baffle guard so mounted to said tray element as to downwardly deflect said abutting portion towards said tray element.

8. A cable tray assembly as defined in claim 1, wherein said cable pulling mechanism includes:

a rope driving pulley to which said pulling rope is mounted;

a motor provided with a rotative driving shaft operatively connected to said rope driving pulley;

wherein, rotation of said driving shaft will bring said driving pulley in rotation, which will cause the longitudinal movement of said pulling rope.

9. A cable tray assembly as defined in claim 8, wherein said cable pulling mechanism includes:

control means associated with said motor for selectively actuating and deactivating said motor;

sensing means for detecting said longitudinal movements of said pulling rope; said sensing means supplying rope movement data to said control means; said control means may therefore actuate said motor when said sensing means detects that said pulling rope is longitudinally moved and deactivate said motor when said sensing means detects that said pulling rope is not moving.

10. A cable tray assembly as defined in claim 1, wherein said predetermined path is generally F-shaped.

11. A cable tray assembly as defined in claim 10 wherein said generally F-shaped predetermined path includes:

a first straight tray portion extending in the proximity of said first location; said first straight tray portion having a proximate end and a distal end;

a T-shaped tray portion mounted to said distal end of said first straight tray portion;

a second straight tray portion having a proximate end and a distal end; said proximate end of said second straight tray portion being so mounted to said T-shaped portion that said second straight tray portion extends in the general direction of said first tray portion;

a third straight tray portion having a proximate end and a distal end; said proximate end of said third straight tray portion being so mounted to said T-shaped portion that said third straight tray portion generally extends at right angle with said first straight tray portion;

an elbow tray portion mounted to said distal end of said second straight tray portion;

a fourth straight tray portion having a proximate end and a distal end; said proximate end of said fourth straight tray portion being so mounted to said elbow portion that said fourth straight tray portion generally extends at right angle with said second straight portion; said third and second straight tray portions being generally parallel and facing one another.

12. A cable tray assembly as defined in claim 11, wherein said pulling rope mounting means include a plurality of pulleys for deviating said pulling rope along said predetermined path.

13. A cable tray assembly as defined in claim 12, wherein said pulling rope mounting means include:

a first pulley mounted in the proximity of said proximate end of said first straight tray portion;

a second pulley mounted to said T-shaped tray portion;

a third pulley mounted to said distal end of said third straight tray portion;

a fourth pulley mounted to said distal end of said fourth straight tray portion; and a fifth pulley mounted to said elbow portion; wherein said pulling rope defining a closed circuit may be mounted to said first, second third, fourth and fifth pulleys to define a generally P-shaped closed circuit.

14. A cable tray assembly as defined in claim 13, wherein said cable pulling mechanism includes a motor provided with a rotative driving shaft operatively connected to one of said first, second, third, fourth and fifth pulley; wherein, rotation of said driving shaft will bring said pulley in rotation, which will cause the longitudinal movement of said pulling rope.

15. A cable tray assembly as defined in claim 14, wherein said cable pulling mechanism includes:

control means associated with said motor for selectively actuating and deactivating said motor;

sensing means for detecting said longitudinal movements of said pulling rope; said sensing means supplying rope movement data to said control means; said control means may therefore actuate said motor when said sensing means detects that said pulling rope is longitudinally moved and deactivate said motor when said sensing means detects that said pulling rope is not moving.

16. A cable tray systems comprising a plurality of cable tray assemblies each supporting at least one cable, each said cable tray assembly comprising:

a tray member for supporting said at least one cable; said tray member defining a predetermined path; and a cable pulling mechanism including:

a pulling rope defining a closed circuit and including a securing element for securing said at least one cable to said pulling rope; and pulling rope mounting means for mounting said pulling rope longitudinally movable with at least a portion of said pulling rope extending along said predetermined path;

wherein, in operation, said at least one cable is secured to said pulling rope through said securing element and is pulled along said predetermined path by longitudinally moving said rope in order to displace said securing element along said predetermined path from a first location to a second location while said at least one cable is supported by said tray member.

* * * * *